Dec. 16, 1969   L. A. ARCHER ETAL   3,484,773
COMBUSTIBLE GAS DETECTOR APPARATUS
Filed Jan. 10, 1968
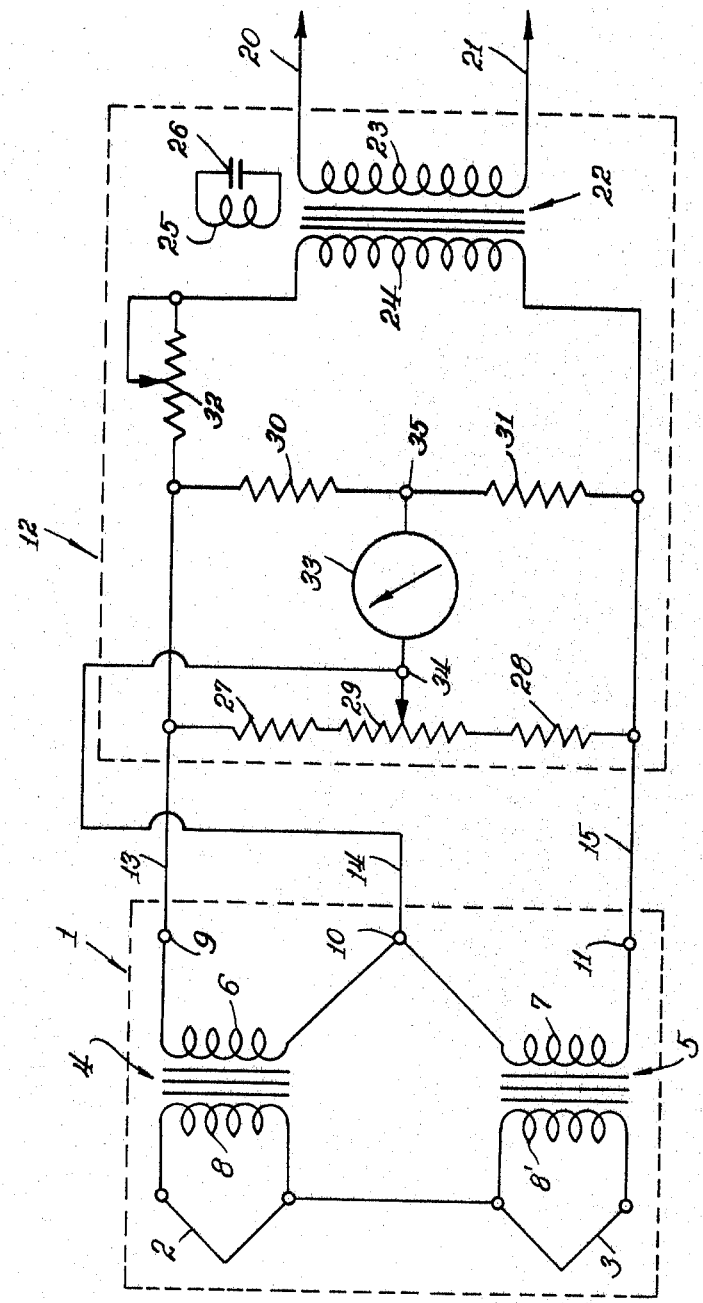
Inventors
Lee A. Archer and
Russel S. Peterman
By Darby, Robertson-Vandenburgh
Att'ys.

United States Patent Office 3,484,773
Patented Dec. 16, 1969

3,484,773
COMBUSTIBLE GAS DETECTOR APPARATUS
Lee A. Archer, Wheaton, and Russel S. Peterman, Des Plaines, Ill., assignors to Erdco Engineering Corporation, Addison, Ill., a corporation of Delaware
Filed Jan. 10, 1968, Ser. No. 696,872
Int. Cl. G08b 21/00; G01n 31/00
U.S. Cl. 340—237
9 Claims

ABSTRACT OF THE DISCLOSURE

Three small gage wires connect the sensing head and remote instrumentation and supply power to the detector and reference filaments, conduct the sensing signal and connect adjustment voltages. The primary windings of step down transformers at the sensing head form two legs of a Wheatstone bridge, the secondaries being connected to the respective filaments. The bridge zero adjustment also equalizes the voltage supplied to each of the two filaments.

BACKGROUND OF THE INVENTION

This invention relates to apparatus for the detection of combustible gases which may be present in the air at a given location.

There are many industrial and military applications which utilize combustible materials either in gaseous form or in volatile liquid form. These materials are capable of causing explosive mixtures of gases or vapors with air if permitted to accumulate in a localized atmosphere, thereby creating a serious hazard to life and property. Many of the combustible gases and vapors are also toxic, and may even be toxic at much lower concentrations than the concentrations at which they are explosive. It may, therefore, be extremely important to detect the presence of such gases or vapors in the atmosphere before the concentration reaches the danger point.

In U.S. Patent 3,239,828, a combustible gas detector is described comprising a Wheatstone bridge having as two arms thereof heated catalytic platinum wires. Gases to be tested are passed over one of the wires, the other being used as a reference. If a combustible gas is present, it is oxidized as it comes in contact with the platinum wire, thereby further raising the temperature of the platinum wire. The increase in temperature causes an increase in the resistance of the platinum wire, thereby unbalancing the bridge and causing an unbalanced alternating current signal to be produced which is amplified. The signal may be measured as an indication of concentration or caused to provide an alarm when the concentration of the combustible gas has reached a predetermined value.

The bridge of this patented system utilizes an alternating current to heat the platinum wires. Since the voltage applied to the platinum wires must necessarily be small, and a relatively large current must be supplied, relatively heavy wires must be used to conduct the current from the indicator module to the sensing head or detector module. Consequently, the two modules forming the detector apparatus must be located close to each other. Moreover, a relatively large number of wires are required between the two modules.

At the high temperatures at which the filaments are continuously operated, the metal slowly oxidizes and is lost. Because the two filaments are never, as a practical matter, exactly identical, and because they operate in slightly differing environments, this loss of metal differs for the two filaments and, with increasing losses, electrical resistance and temperature increase with consequent acceleration of metal loss. In time, the filaments must be replaced at considerable expense.

SUMMARY OF THE INVENTION

The objective of the inventors of this invention was to improve combustible gas detection apparatus to make it possible to separate the detecting and indicating modules by as much as two miles and even more, to simplify and reduce the cost of the apparatus and its operation, to provide improved means for calibration adjustments, and to improve the accuracy and stability of apparatus of this type. These desirable results are achieved essentially by interposing step down transformers at the detector and reference filaments and by circuitry which permits the concurrent adjustment of the bridge voltage zero and equalizes the voltage supplied to each of the two filaments.

A preferred embodiment of the invention is described herein. Briefly, the detector and reference filaments of the sensing head are respectively connected across the secondaries of a pair of identical step down transformers and are connected in series. The primaries of the transformers are connected in series and an adjusted voltage is continuously impressed across the primaries to supply power to maintain the filaments at the desired high temperature. With the primary windings of the two transformers forming two legs, a Wheatstone bridge is completed by providing two additional resistance legs with connection to the midpoint between the transformer primaries. A tapped variable resistance connected in series between these resistance legs of the bridge with the adjustable tap connected to the midpoint between identical fixed resistances connected across the main power supply lines provides means for balancing the bridge, a voltage meter being provided at the tap. As will be understood as the detailed description of the apparatus proceeds, the arrangement is such that the balancing adjustment of the bridge also equalizes the voltages impressed across the two filaments, respectively, and thereby equalizes the normal temperatures of the filaments.

BRIEF DESCRIPTION OF THE DRAWINGS

The drawing shows the circuit of the combustible gas detector apparatus in accordance with the invention.

DESCRIPTION OF THE PREFERRED EMBODIMENT

Referring to the drawing, a remote sensing head or module 1 is shown comprising a pair of platinum filaments 2 and 3 of identical size and electrical resistance. The detector filament 2 is arranged to be exposed to the sample of the air possibly containing the combustible gas to be detected. The reference filament 3 is mounted in close proximity to the reference filament with arrangement for controlled exposure to sample air in known manner to serve as a reference resistance in the bridge circuit sensitive to changes in ambient temperature and other extraneous conditions. Current for heating the filaments 2 and 3 is provided by step down transformers 4 and 5 having primary windings 6 and 7 and secondary windings 8 and 8', respectively. The transformers 4 and 5 are chosen to be as closely identical as practicable, and provide the proper heating current for the filaments 2 and 3 from the line voltage sources available to the primaries.

The primary terminals 9, 10 and 11 are connected to an indicating instrument and power supply module 12 by means of three electrical current conducting wires 13, 14 and 15.

The module 12 is adapted to be connected to an alternating current main 20, 21 which is normally 110 to 120 volts. In order to provide a constant filament voltage to the filaments, a regulating type isolation transformer 22 is desirably used which, in addition to a primary winding 23 and secondary winding 24, is provided with a secondary winding 25, which, together with a capacitance 26, acts to stabilize the output voltage of the transformer 22.

The indicating circuit is arranged in the form of a Wheatstone bridge which, in addition to the arms comprising the primary windings 6 and 7, comprises identical resistors 30 and 31. These resistors are used to provide a reference voltage which is one-half of the voltage between the terminals 9 and 11. Identical resistors 27 and 28 and a variable resistor 29 permit the voltage between the points 9 and 10 to be adjusted so that it is identical to the voltage between terminals 10 and 11 when the filament 2 is exposed to air with no compustible gas content. A variable resistor 32 is inserted in series with the line energizing the bridge to permit an adjustment to enable the proper voltage to be provided between the terminals 9 and 11, which in turn provides the desired voltage through the transformers to the filaments 2 and 3. A voltage indicator 33, as, for example, voltmeter adapted to measure the voltage between points 34 and 35, is used to indicate the presence of, or, if calibrated appropriately, the concentration of, a combustible gas in the air sample which is being tested.

In order to calibrate the apparatus for use, the sensing head is exposed to air known to be free of combustible gases. The variable resistor 29 is then adjusted so that the voltage between points 34 and 35 is zero. The sensing head is then placed in the test location for operation. When the detector filament 2 is exposed to a combustible gas, the gas burns, heating the filament to a higher temperature and thereby increasing the resistance of the filament. This increase in resistance reduces the loading on the transformer 4, thereby increasing the primary voltage between the terminals 9 and 10, since the primary reactance increases. Because the regulating transformer maintains the voltage between terminals 9 and 11 constant, it necessarily follows that the voltage between the terminals 10 and 11 must decrease. Consequently, the voltage difference between points 34 and 35 increases, providing a signal which is detected by the meter 33. Alternatively, various alarms, either visual or audible, or switches may be actuated by the signal voltage formed between points 34 and 35. The signal voltage may be amplified, if desired. When a meter or similar voltage magnitude indicator is used, it may be calibrated to indicate directly the percentage of gas present.

An important feature of the invention resides in the automatic equalizing of the normal temperatures of the two filaments which results from the zero balancing of the bridge circuit when the apparatus is being calibrated. With time, the metal filaments gradually oxidize and invariably the extent and principal locations of oxidation differ for the two filaments. Consequently, the relative resistances of the two filaments continuously change with the consequence that the normal operating temperatures change. Unless appropriate adjustment is made, the rate of change continuously accelerates since relatively greater resistance of one filament results in relatively higher temperature which promotes greater oxidation and consequent increased resistance and temperature. This undesirable process, resulting in premature failure and necessary replacement of the filament, is arrested with each zero balancing calibration, thereby increasing the service lives of the filaments and correspondingly reducing the cost of operation of the apparatus.

Although catalytic metals other than platinum may be used to form the filaments, platinum is preferred because of its acceptable coefficient of resistance. The step down transformers 4 and 5 should desirably have characteristics which are nearly identical. However, unmatched units may be used where suitable compensation is provided so that the bridge may be balanced. The same is true with respect to the resistors 27, 28, 30 and 31. Although balance, unbalance, or increased unbalance, of the bridge may be detected when components having values other than identical ones are utilized, it is highly desirable that closely matched or identical components be utilized for best results.

Although the transformers 4 and 5 have been illustrated and described as having separate primary and secondary windings, it is of course to be understood that transformers in which the two windings are to a degree coextensive, as for example autotransformers, may be utilized. As used herein, the term "transformer" is to be understood as embodying such other types of transformers.

The present combustible gas detector utilizing the primary windings of step down transformers which are used to heat the filaments as operating arms of a Wheatstone bridge provide several advantages over known forms of apparatus in which the filaments themselves directly constitute the operating arms. The principal advantage is that this arrangement permits the bridge to be energized by a relatively high voltage alternating current. This makes it possible to use much smaller gauge wires in connecting the filament-detecting module of the apparatus to the indicating and power supply module. Moreover, as another very important feature of the invention, it permits the filaments and step down transformers of the sensing head to be mounted at a considerable distance from the instrumentation apparatus. For example, the two operating modules of the apparatus may be separated by two miles or more using No. 14 wire for connections. In prior devices in which the filaments themselves form operating arms of the bridge, the low voltage high current requirements restrict the remote positioning of the detector filaments.

It is important to note that the novel circuit herein described makes possible the entire operation and calibration of the apparatus with only three wires connecting the instrumentation and power module with the sensing module. These three conductors (1) transmit power to the filaments to keep them heated, (2) provide voltage connections and information needed to calibrate the instrument and to equalize filament temperatures and (3) return the desired information signals from the sensing head.

The several novel features of the detector apparatus herein described result in substantially reduced installation and operating costs while providing simple and reliable means for calibration and voltage regulation. At the same time, strong and reliable signals are provided as desired for indicators, recorders, alarms or switching or control apparatus.

We claim:
1. In an apparatus for the detection and measurement of concentration of a combustible gas in air which includes a Wheatstone bridge having a pair of resistive arms, adjustable means for balancing said bridge, detector and reference wire filaments, at least said detector filament being exposed to the air to be tested, means for applying an alternating electrical voltage for providing power to heat said filaments and energize said bridge, and means for detecting a signal voltage produced by unbalance of said bridge caused by a change in the relative resistances of said filaments; the improvement which comprises a pair of substantially matched transformers having their primary windings connected to form two arms of said bridge and having their secondary windings connected respectively to said detector and reference filaments, whereby said transformers provide heating current for said filaments and whereby a change in the relative resistances of said filaments causes a bridge unbalance signal voltage detectable by said detecting means.

2. In an apparatus according to claim 1, the improvement wherein said wire filaments are platinum.

3. In an apparatus according to claim 1, the improvement wherein said resistive arms of said bridge have equal values of resistance and provide a reference voltage equal to one-half that of the voltage applied to said bridge.

4. In an apparatus according to claim 1, the improvement wherein a constant voltage transformer is provided in said circuit having its primary winding adapted to be connected to an electrical main and its secondary winding connected to said bridge, thereby providing a constant voltage to said bridge.

5. In an apparatus according to claim 1, the improvement wherein said filaments and said transformers comprise a module as a remote sensing unit and are connected to the remainder of said bridge solely by three electrical wires.

6. In an apparatus according to claim 1, the improvement wherein the primary windings of said transformers are connected in series, and wherein a variable voltage divider is provided having its terminals connected to the non-common terminals of the primary windings of said transformers and having an adjustable tap connected to the common terminal of the primary windings of said transformers, and wherein said means for detecting said unbalance signal voltage is connected between said adjustable tap and the common connection of said resistive arms, whereby balancing adjustment of said bridge to zero voltage simultaneously equalizes the voltages impressed across said two filaments.

7. Combustible gas detector apparatus comprising a pair of substantially identical step down transformers having their primaries and secondaries respectively connected in series, detector and reference sensing filaments connected respectively across the secondaries of said transformers, main power conductors adapted to connect said series-connected primaries with an alternating current power main, a pair of substantially identical resistors connected in series at a common terminal and connected in shunt across said power conductors, a variable resistor connected across said power conductors in parallel with said series-connected pair of identical resistors and having an adjustable tap, said tap being connected with the midpoint of the series-connected primaries of said transformers and signal voltage responsive means connected between said tap and said common terminal of said series-connected identical resistors.

8. Apparatus in accordance with claim 7 and including a voltage regulating type isolation transformer to the secondary of which the power conductors are connected, the primary of said isolation transformer being adapted to be connected with an alternating current power main.

9. Apparatus in accordance with claim 7 and including a variable resistor connected in series in a power conductor.

References Cited

UNITED STATES PATENTS

| | | | |
|---|---|---|---|
| 2,174,923 | 10/1939 | Labino | 23—254 |
| 2,441,677 | 5/1948 | Stallsmith | 340—237 |
| 3,239,828 | 3/1966 | Peterman | 340—237 |

JOHN W. CALDWELL, Primary Examiner

DANIEL MYER, Assistant Examiner

U.S. Cl. X.R.

73—27